April 9, 1968

T. A. THOREN 3,376,834

HEAT INSULATING STRUCTURE AND A HEAT GENERATING
APPARATUS INCLUDING SUCH A HEAT
INSULATING STRUCTURE

Filed May 31, 1966

United States Patent Office 3,376,834
Patented Apr. 9, 1968

3,376,834
HEAT INSULATING STRUCTURE AND A HEAT
GENERATING APPARATUS INCLUDING SUCH
A HEAT INSULATING STRUCTURE
Torgny Alexis Thorén, 23 Kruthornsvagen,
23 Sollentuna, Sweden
Filed May 31, 1966, Ser. No. 553,871
Claims priority, application Sweden, May 31, 1965,
7,092/65
10 Claims. (Cl. 110—56)

ABSTRACT OF THE DISCLOSURE

A heat insulating structure including spaced walls between which is provided a gas permeable wall defining with each of the first said walls respective spaces between which gas flow is induced preferably in a direction which is countercurrent to the thermal gradient involved. The intermediate wall may be provided with outer surfaces which are perforated to facilitate gas flow and one of the spaces which is formed may be provided with a partitioned wall dividing this space into two smaller and parallel spaces, one of which participates in the gas flow involving the porous intermediate wall and the other of which accommodates a gas flow which is, according to one embodiment, independent of the main gas flow and which is according to another embodiment a part of the main gas flow.

---

Figure 1:
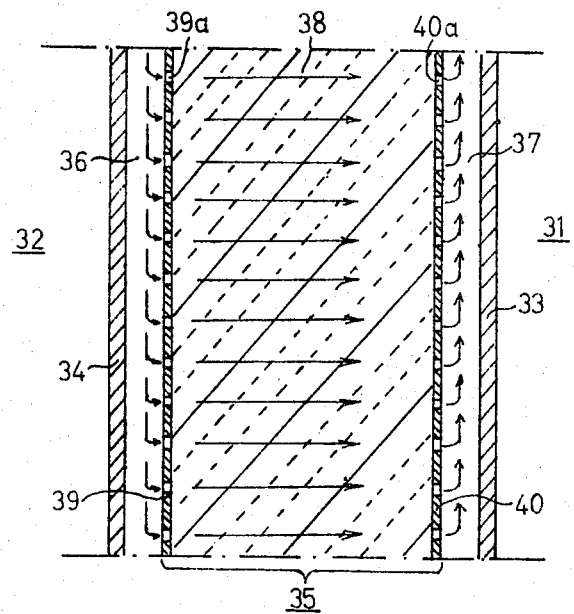

The present invention relates primarily to a heat insulating structure. This heat insulating structure can be used in walls, floors, roofs etc. of dwellings and other buildings for heat insulation of the heated spaces in the building. It can also, however, be used in walls, floors, roofs and so forth of cooled spaces, as for instance cold stores for insulation thereof with respect to the surrounding warmer spaces. Still another particularly advantageous use of the heat insulating structure according to the invention is in heat generating systems comprising a combustion chamber with a combustion air inlet, as for instance heating plants for buildings, lime kilns, blast furnaces and so forth. In particular the heat insulating structure according to the invention can be used advantageously for the heat insulation of the chimney and/or the furnace of building heating plants.

The heat insulating structure according to the invention comprises two outer, comparatively rigid wall members arranged mutually parallel and spaced from each other so as to form two outer surfaces of the heat insulating structure and an internal wall member disposed between said two outer wall members substantially parallel thereto in such a way that a first gas-filled space extending substantially over the area of the heat insulating structure is enclosed between the one outer wall member and said internal wall member and a second similar gas-filled space extending substantially over the area of the heat insulating structure is enclosed between the second outer wall member and said internal wall member, said internal wall member being permeable and having a large number of gas flow passages distributed over substantially the entire area of the wall member and extending from the one side surface to the opposite side surface of the wall member substantially perpendicular to the extension of said internal wall member, and said first space communicating with a gas inlet port, and said second space communicating with a gas outlet port, so that a flow of gas can be maintained through said gas inlet port into said first space, from said first space through said gas permeable internal wall member into said second space and from said second space through said gas outlet port.

When using the heat insulating structure according to the invention this is so disposed between a warm wall space and a cold space, between which a heat insulation is to be achieved, in such a way that said first gas-filled space in the heat insulating structure is closest to the cold space, whereas said second gas-filled space in the heat insulating structure is closest to the warm space. Furthermore a flow of gas, as for instance air, is created and maintained through the structure as previously described, whereby said gas flow will pass through the gas permeable internal wall member in the heat insulating structure in a direction opposite to the temperature gradient through the heat insulating structure between the warm space and the cold space, that is in a direction opposite to the direction in which heat tends to be transmitted from the warm space to the cold space. Due to the very large number of flow passages through the internal wall member and the comparatively small flow area of each single flow passage, the flow velocity of the gas within the internal wall member will be comparatively low and during the passage through this internal wall member in the heat insulating structure the gas flow will therefore absorb any heat tending to leak through the heat insulating structure from the warm space to the cold space, that is in opposite direction to the gas flow. In this way any heat leakage from the warm space to the cold space through the heat insulating structure according to the invention is effectively prevented. The gas flowing through the heat insulating structure according to the invention will consequently leave the structure through the gas outlet port from said second space in the structure at a higher temperature than the temperature of the gas flow when entering said first space of the structure through said gas inlet port. The heated gas volume discharged from the heat insulating structure can be used for various purposes, as will be further described in the following, so that the thermal energy stored in this gas volume, which corresponds to the heat trying to leak from the warm space to the cold space through the heat insulating structure, is recovered.

The gas permeable internal wall member of the heat insulating structure according to the invention can consist of a material, which is in itself permeable to a gas flow, as for instance a porous material with open and mutually communicating pores forming a very large number of very narrow flood passages for a gas flow through the material. The gas permeable material in the internal wall member of the heat insulating structure according to the invention can, however, also and preferably consist of a fibrous material, for instance consisting of mineral fibers as, rockwool or slag wool, or glass fibers, preferably having a general direction of the fibers perpendicular to the extension of the wall member, that is parallel to the direction of gas flow through the wall member. If such a material should be too loose to be self-supporting, it can be provided with perforated backing sheets, for instance of paper, plastic or metal, bonded to the fibrous material on both side surfaces of the internal wall element. In this case the permeability of the internal wall element to the gas flow can easily be predetermined by means of the perforation of these backing sheets or surface layers. The internal wall member of the heat insulating structure according to the invention can, however, also consist of a porous or non-porous material, which is not in itself permeable to a gas flow but which is provided with a plurality of narrow openings or passages for the gas flow extending through the wall member from the one side to the opposite side thereof. The gas permeable internal wall member of the heat insulating structure according to the invention can also for instance consist of corrugated or similarly shaped sheets or bands of for instance metal or paper or plastic, which are disposed side by side close to each other in such a way that flow passages are formed between adjacent corrugated sheets or bands respectively extending substantially perpendicular to the extension of the wall member. Various other forms for the gas permeable internal wall member of the heat insulating structure according to the invention are possible within the scope of the invention. Essential is that this internal wall member is permeable to a gas flow substantially uniformly over its entire area, in that the wall member comprises a large number of flow passages distributed throughover the area of the wall member and extending substantially perpendicularly to the extension of the wall member.

The outer wall members of the heat insulating structure according to the invention are preferably gas-tight and impermeable to any gas flow, so that said first gas-filled space in the structure forms a gas distributing chamber, in which the gas flow supplied to this space through the gas inlet port is distributed over the entire surface area of the internal wall member, and said second gas-filled space of the structure forms a similar gas-collecting chamber, in which the gas flows passing through the internal wall member are collected and discharged through to said gas outlet port.

When using the heat insulating structure according to the invention in heat generating apparatuses or systems of the type having a combustion chamber with a combustion air inlet, as for instance building heating plants, lime kilns or cement kilns, blast furnaces, etc., the heat insulating structure according to the invention is arranged to surround the hot or heated parts of the heat generating apparatus to be insulated with said second space in the heat insulating structure closest to the hot part to be insulated and with the gas inlet port to said first space in the heat insulating structure communicating with the atmosphere and the gas outlet port from said second space in the heat insulating structure communicating with the combustion air inlet of the combustion chamber in the heating apparatus, so that at least part of the combustion air for the combustion chamber is taken through the heat insulating structure according to the invention. In this way the thermal energy which tends to leak from the hot or heated parts of the system to the environment but which is instead absorbed by the air-flow passing through the heat insulating structure according to the invention surrounding said hot or heated parts, will be made use of for preheating the combustion air supplied to the combustion chamber of the system. In this way the efficiency of the heat generating system or apparatus is increased considerably at the same time as the outside temperature of the system or apparatus respectively can be kept low.

Figure 2:
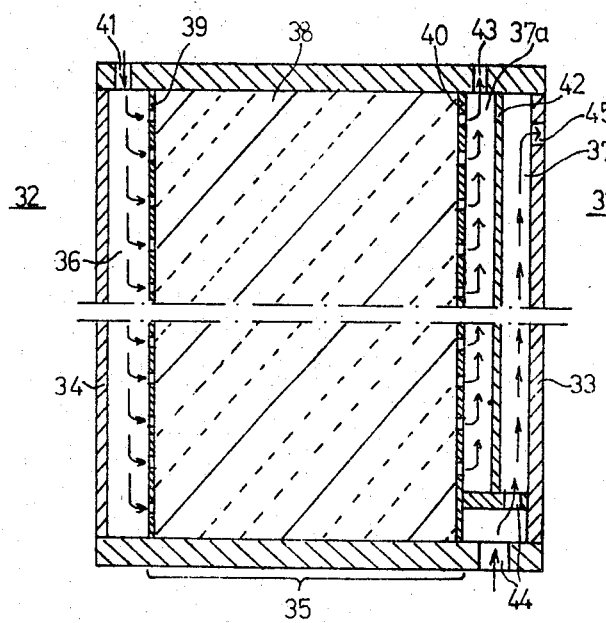
Figure 3:
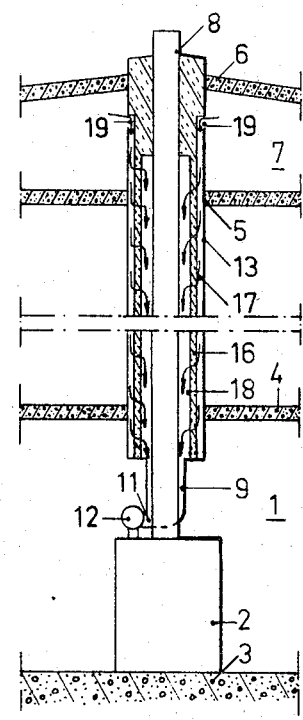

In the following the invention will be further described with reference to the accompanying drawings, in which:

FIG. 1 shows schematically and in section a heat insulating structure according to the invention, FIG. 2 is a sectional view of a wall construction for a heated building, embodying the present invention, FIG. 3 shows schematically and partially in vertical section a building heating plant having a furnace and a chimney and including a heat insulating structure according to the invention in the chimney construction.

Figure 4:
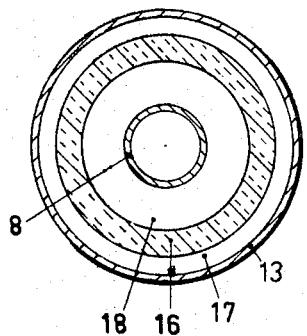
Figure 5:
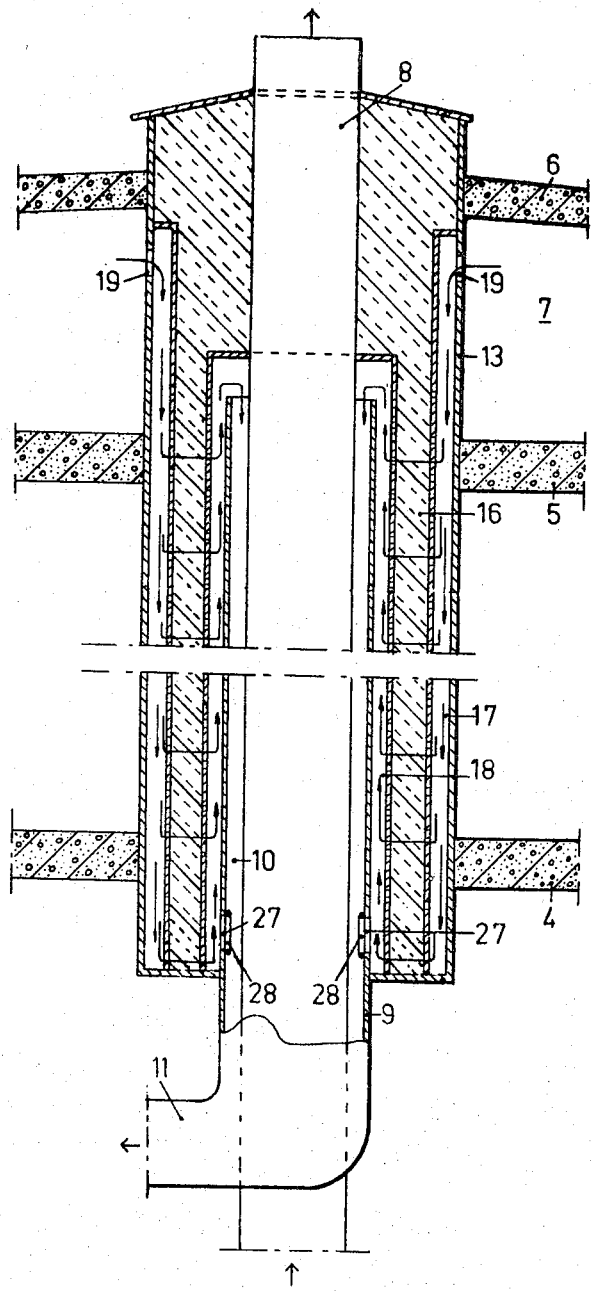
Figure 6:
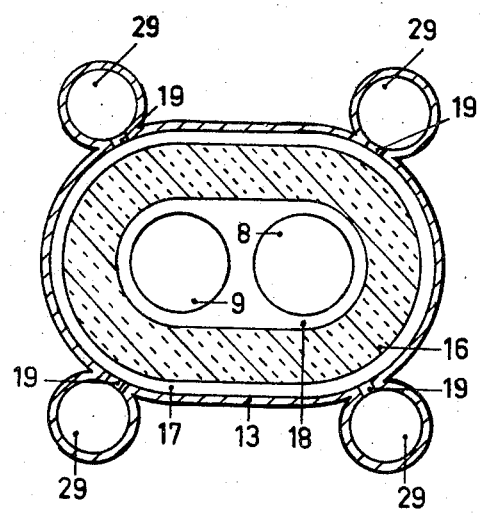
Figure 7:
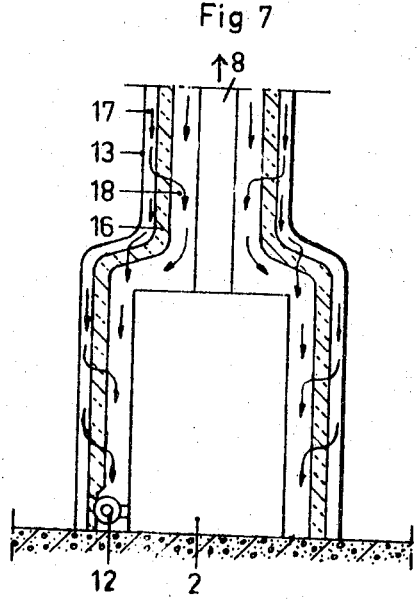

FIG. 4 is a cross section through the chimney construction in FIG. 3,

FIG. 5 shows in vertical section another chimney construction for a furnace including a heat insulating structure according to the invention, FIG. 6 is a cross section through still another chimney construction including a heat insulating structure according to the invention, and FIG. 7 is a vertical section through a part of a heating plant with a furnace and a chimney, in which the smoke flue in the chimney as well as the furnace are surrounded by a heat insulating structure according to the invention.

In FIG. 1 a heat insulating structure according to the invention separates a warm space 31 and a cold space 32 in order to prevent heat transmission or leakage from the warm space 31 to the cold space 32. The heat insulating structure comprises two outer, comparatively rigid wall members 33 and 34, which are mutually parallel and spaced from each other and extending throughout the area of the heat insulating structure between the warm space 31 and the cold space 32. Between these outer wall members 33 and 34 the heat insulating structure comprises an internal wall member 35, which extends parallel to the outer wall members 33 and 34 throughout the area of the heat insulating structure and which is spaced from the outer wall member 33 as well as the outer wall member 34. Between the outer wall member 34 and the internal wall member 35 there is consequently a first space 36 extending substantially throughout the area of the structure and between the other outer wall member 33 and the internal wall member 35 there is a similar second space 37. The internal wall member 35 is permeable to a flow of gas in a direction substantially perpendicularly to the extension of the wall member, that is from the one side surface to the opposite side surface of the internal wall member 35, as for instance from the space 36 to the space 37 in the structure. In the illustrated embodiment of a heat insulating structure according to the invention, the internal wall member 35 consists of a comparatively thick core 38 of a gas permeable, porous material, preferably fibrous material consisting of for instance rockwool, slag wool or glass fibers or similar, permitting a substantially uniform flow of gas through the core in direction perpendicular to the extension of the wall member 35. This gas permeable core 38 is provided with surface layers 39 and 40 of sheet material, as for instance paper, plastic or metal, bonded to the core 38. These surface sheets 39 and 40 are perforated with a large number of apertures 39a and 40a respectively, through which the spaces 36 and 37 respectively communicate with the interior of the central, gas permeable core 38. The space 36 in the heat insulating structure closest to the cold space 32 communicates with a gas inlet port (not shown in the drawing), whereas the second space 37 in the structure disposed closest to the warm space 31 communicates with a gas outlet port (not shown in the drawing). The gas inlet port and the gas outlet port can be provided in the wall member 34 and the wall member 33 respectively or in some other suitable member of the structure.

This heat insulating structure is operated in the following manner. A flow of gas, preferably air, is supplied to the space 36 which is closest to the cold space 32 through the above mentioned gas inlet port communicating with this space. In the space 36 this air flow is distributed substantially uniformly over the entire surface area of the air permeable internal wall member 35 of the structure and the air flow will pass through this internal flow member to the space 37 which is closest to the warm space 31. In this space 37 the air flow from the permeable internal wall member 35 is collected and discharged through the above mentioned outlet port communicating with this space 37. Within the permeable internal wall member 35 of the structure the direction of the air flow will consequently be opposite to the temperature gradient between the warm space 31 and the cold space 32 and thus opposite to the direction of heat transmission from the warm space 31 to the cold space 32. Due to the comparatively low velocity of the air flow within the internal wall member 35, caused by the very large number of narrow flow passages therein, the air flow will, when passing through the internal wall member 35, absorb any heat tending to leak through the heat insulating structure from the warm space 31 towards the cold space 32, whereby any transmission of heat from the warm space 31 to the cold space 32 through the heat insulating structure according to the invention is effectively prevented. The air flow will obviously be discharged through the gas outlet opening communicating wtih the space 37 at a higher temperature than the temperature at which the air flow is supplied to the space 36 through the gas inlet port, the difference in thermal energy of the air flow when discharged from the space 37 on the one hand and when supplied to the space 36 on the other obviously corresponding to the thermal energy, which should be transmitted from the warm space 31 to the cold space 32 through the heat insulating structure in the absence of the air flow. The air flow discharged from the space 37 through the gas outlet port can be used in various ways, for instance as preheated fresh air for an air-conditioning system for the warm space 31 or as preheated combustion air for a heating system for the warm space 31, so that the thermal energy absorbed by the air flow passing through the heat insulating structure is recovered.

In order to prevent heat transmission from the wam space 31 to the cold space 32 by radiation the inner surfaces of the wall members 33 and 34 facing the spaces 37 and 36 respectively can be provided with a heat reflecting surface coating or surface layer, for instance a metal foil.

The gas permeable internal wall member 35 of the structure can be constructed in various ways and consist of various materials as previously described. If the material of the gas permeable core 38 of the internal wall member 35 is sufficiently rigid in itself to be self-supporting the surface sheets 39 and 40 can of course be omitted.

The wall member 33 of the structure will obviously be somewhat cooled by the air-flow through the structure and there is consequently a certain danger of condensation on the external surface of this wall member 33 facing the warm space 31. Such condensation must of course be prevented, when the heat insulating structure according to the invention is to be used as a heat insulating wall, roof, or floor construction in buildings. This object can be achieved with a modified form of the heat insulating structure according to the invention as shown schematically in FIG. 2, wherein a wall element for a building including a heat insulating structure according to the invention is shown in section. In FIG. 2 the same reference numerals are used for corresponding elements as in FIG. 1. The wall construction in FIG. 2 consists of the two outer wall members 33 and 34, the air permeable internal wall member 35 and the space 36, to which an air flow can be supplied through the air inlet opening 41. In the space between the internal wall member 35 and the outer wall member 33 closest to the warm space 31 (the interior of the building) an additional, comparatively thin, impermeable wall member 42 is disposed parallel to the wall members 33 and 35 so as to divide the space therebetween in a space 37a closest to the permeable internal wall member 35 and communicating with the air outlet opening 43 for the air flow passing through the wall member 35, and an additional space 37b closest to the outer wall member 33 facing the interior of the building. This additional space 37b is provided with inlet ports 44 and outlet ports 45. A flow of warm air is supplied to this space 37b through the inlet ports 44 and is discharged from the space 37b through the outlet port 45. This flow of warm air is preferably part of a hot air heating system for the building. In this way the surface of the wall construction facing the interior of the building will always be warm, whereby no condensation can occur on this surface.

FIG. 3 shows schematically and in vertical section a building heating plant comprising an oil burning furnace and a chimney construction for said furnace, wherein the chimney construction includes a heat insulating structure according to the invention. The oil burning furnace 2 of the heating plant is located in the basement 1 of the building and connected to the lower end of a vertical chimney construction extending vertically upwards through the building. Of the building only the floor 3 of the basement 1, the first floor 4 forming also the ceiling of the basement, the ceiling 5 of the uppermost storage in the building, the roof 6 and the attic space 7 beneath the roof 6 are shown. The furnace 2 is provided with an oil burner assembly 12 including a fan for the combustion air connected to a supply pipe 11 for combustion air. To the combustion chamber in the furnace 2 the lower end of smoke flue 8 in the chimney construction is connected. The smoke flue 8 terminates as normal at some height above the roof 6 of the building. The smoke flue 8 is over substantially its entire length surrounded coaxially by a heat insulating structure according to the invention consisting of an air-tight outer wall 13 forming also the outer wall of the chimney construction, the wall of the smoke flue 8, the intermediate air permeable wall member 16, an inner annular space 18 between the smoke flue 8 and the air permeable wall 16, and an outer annular space 17 between the air permeable wall 16 and the outer chimney wall 13. The annular space 17 on the outside of the air permeable wall 16 communicates with the atmosphere through openings 19 in the outer wall 13 within the attic space 7 of the building. The annular space 18 inside the air permeable wall 16 is connected to the combustion air inlet to the oil burner 12 through a pipe 9 coaxially surrounding the lowermost portion of the smoke flue 8. The combustion air for the oil burner 12 of the furnace 2 will consequently enter the annular space 17 through the openings 19 in the outer chimney wall 13. In the space 17 the flow of combustion air is distributed substantially uniformly over the entire area of the air permeable wall 16 and the flow of combustion air will pass through this wall 16 in a substantially radial direction into the annular space 18 inside the wall 16. In this annular space 18 the flow of combustion air flows downwards into the tube 9 and to the combustion inlet 11 for the oil burner 12. When passing through the air permeable wall 16 coaxially surrounding the smoke flue 8 the combustion air will absorb any heat tending to leak radially outwards from the hot smoke flue 8 to the surrounding building spaces. In this way the heat losses from the smoke flue 8 are effectively eliminated or reduced. The thermal energy absorbed by the combustion air when passing through the wall 16 and along the hot smoke flue 8 is used for preheating the combustion air supplied to the oil burner 12, wherefore the thermal efficiency of the heating plant is considerably increased. A further advantage of the arrangement according to the invention is that the outer surface of the chimney construction will be kept at a low temperature, wherefore no uncomfortably high temperatures will arise in the building close to the chimney construction and all risks for overheating of building structures close to the chimney constructions are eliminated.

FIG. 5 shows in vertical section a chimney construction, which in most respects is identical to the chimney construction shown in FIGS. 3 and 4 but is provided with one essential additional feature. Corresponding members in the chimney construction shown in FIG. 5 and the chimney construction shown in FIGS. 3 and 4 are provided with identical reference numerals. The chimney construction in FIG. 5 differs from the chimney construction shown in FIGS. 3 and 4 in that the tube 9 coaxially surrounding the smoke flue 8 and connected by the combustion air inlet 11 to the combustion chamber of the furnace is prolonged vertically upwards in the chimney construction into the space between the smoke flue 8 and the air permeable wall member 16, whereby said space is divided by the tube 9 in a first annular space 18 between the tube 9 and the air permeable wall 16 and a second annular space 10 between the tube 9 and the smoke flue 8. These two annular spaces 18 and 10 communicate with each other at their upper ends. After the passage through the air permeable wall 16 the combustion air will consequently rise vertically upwards in the annular space 18 and will subsequently descend vertically downwards in the annular space 10 between the tube 9 and the smoke flue 8. When rising vertically upwards in the annular space 18 the combustion air will in the lower and warmer portion of the chimney construction absorb a certain amount of heat from the hot smoke flue 8 and transfer this amount of heat to the upper portion of the chimney construction. In this way the temperature drop in the smoke flue 8 in the axial direction thereof can be reduced, which as advantageous, as there exists always a certain risk for condensation inside the uppermost portion of the smoke flue 8, if the temperature drop in the axial direction of the smoke flue 8 is too large. Such condensation should if possible be prevented, as it can give rise to corrosion of the walls of the smoke flue 8.

As the temperature difference between the smoke flue and the outside of the chimney construction is larger in the lower portion of the chimney construction than in the upper portion thereof, it is advantageous, if the air flow through the air permeable wall 16 is larger in the lower portion of the chimney construction than in the upper portion thereof. This can be easily achieved by constructing the air permeable wall 16 in such a way that its permeability to the combustion air flow is larger in the lower portion of the chimney construction than in the upper portion thereof.

At the lowermost end of the chimney construction there can be larger openings for the combustion air flow from the annular space 17 to the annular space 18, provided with valve means operable from the outside of the chimney construction so that the flow area through these larger openings can be adjusted for the control of the air volume passing through the air permeable wall 16.

In a chimney construction for an intermittently operating furnace, as for instance an oil burner furnace, it can be advantageous to provide the tube 9 with openings 27 at the lowermost end of the chimney construction and with valve means 28 for closing these openings. These valve means are controlled for instance by a thermostat so as to be opened when the combustion in the furnace is started. At the combustion start the combustion air will then flow directly into the space 10 from the lower portion of the annular space 18 without travelling first to the upper end of the chimney construction. In this way the flow resistance for the combustion air is reduced, which can be advantageous when the furnace is started. When the furnace has started and thus the temperature increases in the lowermost portion of the chimney construction the valve means 28 are automatically closed and the chimney construction will thereafter operate in the manner previously described.

FIG. 6 shows a cross section through a chimney construction in which the tube 9 connected to the combustion air intake of the furnace is prolonged vertically upwards into the chimney construction, just as in the chimney construction shown in FIG. 5, but is not coaxially surrounding the smoke flue 8 in the chimney construction but instead extends parallel to the smoke flue 8 in the space 18 between the smoke flue 8 and the air permeable wall 16. The chimney construction shown in FIG. 6 comprises also air shafts 29 for the ventilation of the building, in which the chimney construction is located. These air shafts 29 run parallel to the chimney construction and communicate with the space 17 inside the outer wall 13 of the chimney construction, whereby the warm air evacuated from the building through these air shafts 29 can be used at least partially as combustion air for the furnace.

FIG. 7 shows in section and schematically the lower portion of a heating plant comprising the furnace 2 with its oil burner 12 and the smoke flue 8. In this heating plant the smoke flue 8 as well as the furnace 2 are coaxially surrounded by the heat insulating structure according to the invention consisting of the outer wall 13, the space 17, to which the combustion air is supplied from the surrounding atmosphere, the air permeable wall 16 and the space 18 between this air permeable wall 16 and the smoke flue 8 and the furnace 2 respectively. In this way any heat leakage from the furnace 2 to the surrounding spaces in the building is also prevented in the same way as the radial heat leakage from the smoke flue 8. In an arrangement according to FIG. 7, wherein the furnace as well as the smoke flue are surrounded by an heat insulating structure according to the invention, it is of course also possible to arrange an additional partition wall, corresponding to the tube 9 in the chimney construction shown in FIG. 5, in the space 18 between the air permeable wall 16 and the smoke flue 8 and the furnace 2 respectively so as to divide this space in a first space closest to the wall 16, in which first space the combustion air is rising vertically upwards, and a second space closest to the smoke flue 8 and the furnace 2 respectively, in which second space the combustion air is descending vertically downwards to the air inlet to the oil burner 12.

What is claimed is:

1. A heat generating system comprising a combustion chamber with a combustion air inlet, parts connected to said chamber and heated by association therewith, and a heat insulating structure at least partially surrounding hot parts of the system, said heat insulating structure including a gas previous wall member disposed in spaced relation from said hot parts so as to form a first gas-filled space extending substantially throughout the area of the heat insulating structure between said hot parts and said gas pervious wall member, said gas pervious wall member having a large number of gas-flow passages distributed over substantially the entire area thereof and extending substantially, perpendicularly to the wall member between said first gas-filled space and the opposite side of the wall member, said opposite side of the wall member communicating with the surrounding atmosphere and said first gas-filled space communicating with a gas outlet port, said gas outlet port being in communication with said combustion air inlet for said combustion chamber, whereby the combustion air to said combustion chamber will be supplied at least partially through said heat insulating structure.

2. A heat generating system as claimed in claim 1 comprising a second wall member extending substantially parallel to said gas pervious wall member and disposed on the opposite side of said gas pervious wall member with respect to said hot part and spaced from said gas pervious wall member to form a second gas-filled space which extends substantially throughout the area of the heat insulating structure between said second wall member and said gas pervious wall member, said second gas-filled space communicating with a gas inlet port communicating with the surrounding atmosphere.

3. A heat generating system as claimed in claim 2, comprising a chimney construction including a smoke flue connected to said combustion chamber, said heat insulating structure coaxially surrounding said smoke flue in such a way that an annular space constituting said first gas-filled space in said heat insulating structure is formed between the wall of said smoke flue and said gas pervious wall member of said heat insulating structure and said second wall member of said heat insulating structure forms the outer wall of said chimney construction, the annular space between said smoke flue and said gas pervious wall member of said insulating structure communicating with the combustion air inlet to said combustion chamber and the annular space between said gas pervious wall member and said outer wall of the chimney construction communicating with the surrounding atmosphere at the upper portion of said chimney construction.

4. A heat generating system as claimed in claim 3, comprising an impervious partition wall coaxially surrounding said smoke flue in said annular space between said gas pervious wall member and said smoke flue so as to divide said annular space into a first annular space closest to said smoke flue, said first annular space communicating at its lowermost end via said combustion air inlet with said combustion chamber, and a second annular space disposed closest to said gas pervious wall member, said second annular space communicating at its upper end with said first annular space.

5. A heat generating system as claimed in claim 3, comprising means defining a combustion air shaft connected to said combustion air inlet of said combustion chamber and extending vertically upwards in said chimney construction parallel to said smoke flue in the space between said smoke flue and said gas pervious wall member, the upper end of said combustion air tube being in open communication with said space.

6. A heating generating system as claimed in claim 3, comprising air evacuating shafts for a building in which the heat generating system is located running parallel with said chimney construction and communicating with the space within the chimney construction between said outer chimney wall and said gas pervious wall member.

7. A heat generating system as claimed in claim 2 wherein said second wall member is impervious to gas flow.

8. A heat generating system as claimed in claim 2 wherein said second wall member includes a heat reflecting surface layer facing said second gas-filled space.

9. A heat generating system as claimed in claim 1 wherein said gas pervious wall member includes a porous, gas pervious material.

10. A heat generating system as claimed in claim 9 wherein said gas pervious wall member includes surface layers of perforated sheet material embracing said porous material.

References Cited

UNITED STATES PATENTS

| | | | |
|---|---|---|---|
| 2,638,160 | 5/1953 | Thomson | 158—91 |
| 2,745,397 | 5/1956 | Levin | 126—77 |
| 2,921,176 | 1/1960 | Scofield | 158—99 |
| 3,057,400 | 10/1962 | Wagner | 158—99 |
| 3,061,416 | 10/1962 | Kazokas. | |
| 3,193,263 | 7/1965 | Ruff | 158—99 |

OTHER REFERENCES 1,187,394  3/1959  France.

FREDERICK L. MATTESON, Jr., *Primary Examiner.*

H. B. RAMEY, *Assistant Examiner.*